(12) United States Patent
Chaumonnot et al.

(10) Patent No.: US 8,623,508 B2
(45) Date of Patent: Jan. 7, 2014

(54) CRYSTALLIZED SILICON-CONTAINING MATERIAL WITH HIERARCHICAL AND ORGANIZED POROSITY

(75) Inventors: Alexandra Chaumonnot, Lyons (FR); Stephanie Pega, Aulnay sous Bois (FR); Clement Sanchez, Gif-sur-Yvette (FR); Cedric Boissiere, Paris (FR)

(73) Assignee: IFP, Rueil-Malmaison Cedex (FR)

( * ) Notice: Subject to any disclaimer, the term of this patent is extended or adjusted under 35 U.S.C. 154(b) by 598 days.

(21) Appl. No.: 12/676,750

(22) PCT Filed: Aug. 29, 2008

(86) PCT No.: PCT/FR2008/001216
§ 371 (c)(1),
(2), (4) Date: Aug. 10, 2010

(87) PCT Pub. No.: WO2009/060144
PCT Pub. Date: May 14, 2009

(65) Prior Publication Data
US 2010/0297002 A1 Nov. 25, 2010

(30) Foreign Application Priority Data
Sep. 7, 2007 (FR) ..................... 07 06294

(51) Int. Cl.
*B32B 1/00* (2006.01)
*C01B 39/02* (2006.01)
*B29B 9/16* (2006.01)
*B01J 29/06* (2006.01)

(52) U.S. Cl.
USPC ............... 428/404; 428/403; 502/60; 502/63; 502/64; 423/700

(58) Field of Classification Search
None
See application file for complete search history.

(56) References Cited

U.S. PATENT DOCUMENTS

| | | | | |
|---|---|---|---|---|
| 6,669,924 B1 * | 12/2003 | Kaliaguine et al. | ........... | 423/702 |
| 7,807,598 B2 * | 10/2010 | Euzen et al. | .................... | 502/71 |
| 7,994,085 B2 * | 8/2011 | Chaumonnot et al. | .......... | 502/63 |
| 2002/0131930 A1 * | 9/2002 | Pinnavaia et al. | ............. | 423/702 |
| 2006/0030477 A1 | 2/2006 | Chaumonnot et al. | | |
| 2006/0292054 A1 | 12/2006 | Chaumonnot et al. | | |
| 2009/0029847 A1 | 1/2009 | Euzen et al. | | |

FOREIGN PATENT DOCUMENTS

| | | |
|---|---|---|
| EP | 1 627 852 A | 2/2006 |
| EP | 1 627 853 A | 2/2006 |
| WO | WO 2006/128989 A | 12/2006 |

OTHER PUBLICATIONS

Zhang et al, Preparation and characterization of Beta/MCM-41 composite zeolite with a stepwise-distributed pore structure, Powder Technology 183 (2008) pp. 73-78.*
"International Search Report," International Application No: PCT/FR2008/001216, Date of Completion Jun. 10, 2009, Date of Completion Jun. 17, 2009, 4 pages.
Verjpef M J et al, "Partial Transformation of MCM-41 Material Into Zeolites: Formation Nanosized MFI Type Crystallites," Chemistry of Materials, American Chemical Society, Washington, US, vol. 13, No. 2, Feb. 1, 2001, XP001005184, ISSN: 0897-4756.

* cited by examiner

*Primary Examiner* — Monique Jackson
(74) *Attorney, Agent, or Firm* — Millen, White, Zelano & Branigan, P.C.

(57) ABSTRACT

Material with hierarchical and organized porosity in the microporosity and mesoporosity domains, consisting of at least two elementary spherical particles, each one of said particles comprising a matrix based on silicon oxide, mesostructured, having a mesopore diameter ranging between 1.5 and 30 nm and exhibiting microporous and crystallized walls of thickness ranging between 1 and 60 nm, said elementary spherical particles having a maximum diameter of 200 microns. The preparation of said material is also described.

19 Claims, No Drawings

CRYSTALLIZED SILICON-CONTAINING MATERIAL WITH HIERARCHICAL AND ORGANIZED POROSITY

FIELD OF THE INVENTION

The present invention relates to the field of materials containing silicon, notably metallosilicate materials and more precisely aluminosilicate materials, with hierarchical and organized porosity within the microporosity and mesoporosity domains. It also relates to the preparation of these materials that are obtained by means of the synthesis technique referred to as aerosol synthesis.

BACKGROUND OF THE INVENTION

New synthesis strategies allowing to obtain materials of well-defined porosity in a very wide range, from microporous materials to macroporous materials to hierarchical porosity materials, i.e. having pores of several sizes, have known a very large development within the scientific community since the mid-90s (G. J. de A. A. Soler-Illia, C. Sanchez, B. Lebeau, J. Patarin, Chem. Rev., 2002, 102, 4093). In particular, considerable work has been done on the development of materials having a microporosity of zeolitic nature and a mesoporosity so as to simultaneously benefit from the catalytic properties specific to zeolites and from the catalytic and especially the textural properties of the mesoporous phase.

A technique that is commonly used to generate materials having such biporosity consists in directly creating mesopores within zeolite crystals by subjecting the zeolite to a steam-hydrothermal treatment, also referred to as steaming. Under the effect of this treatment, the mobility of the tetrahedric atoms that make up the framework of the zeolite is increased to such an extent that some of these atoms are extracted from the network, which causes formation of amorphous zones that can be cleared to give way to mesoporous cavities (A. H. Jansen, A. J. Koster, K. P. de Jong, J. Phys. Chem. B, 2002, 106, 11905). The formation of such cavities can also be obtained by subjecting the zeolite to an acid treatment (H. Ajot, J. F. Joly, J. Lynch, F. Raatz, P. Caullet, Stud. Surf. Sci. Catal., 1991, 62, 583). These methods however have the drawback of making part of the zeolite partly amorphous and of modifying the properties thereof through variation of the chemical composition. In any case, the mesoporosity thus introduced allows to eliminate or at least to limit diffusion limitation problems encountered in microporous materials, mesopores having much greater diffusion factors than micropores and thus allowing access to the active sites of the zeolites (P. B. Weisz, Chemtech, 1973, 3, 498).

More recently, much work has been done on the elaboration of mixed mesostructured/zeolite materials, mesostructured materials affording the additional advantage of a perfectly organized and calibrated porosity in the mesopore range.

It can be briefly reminded here that mesostructured materials are conventionally obtained via synthesis methods referred to as soft chemistry methods that consist in bringing together, in an aqueous solution or in polar solvents, inorganic precursors with structuring agents, generally molecular or macromolecular surfactants, ionic or neutral. Control of electrostatic interactions or of interactions through hydrogen bonds between the inorganic precursors and the structuring agent jointly linked with hydrolysis/condensation reactions of the inorganic precursor leads to a cooperative assembly of the organic and inorganic phases generating micellar aggregates of surfactants of uniform size controlled within an inorganic matrix. Clearance of the porosity is then obtained by surfactant elimination, which is conventionally carried out by means of chemical extraction processes or by thermal treatment. Depending on the nature of the inorganic precursors and of the structuring agent used, and on the operating conditions applied, several families of mesostructured materials have been developed, such as the M41S family obtained using quaternary ammonium salts as the structuring agent (J. S. Beck, J. C. Vartuli, W. J. Roth, M. E. Leonowicz, C. T. Kresge, K. D. Schmitt, C. T.-W. Chu, D. H. Olson, E. W. Sheppard, S. B. McCullen, J. B. Higgins, J. L. Schlenker, J. Am. Chem. Soc., 1992, 114, 27, 10834) or the SBA family obtained using three-block copolymers as the structuring agent (D. Zhao, J. Feng, Q. Huo, N. Melosh, G. H. Fredickson, B. F. Chmelka, G. D. Stucky, Science, 1998, 279, 548).

Several synthesis techniques allowing elaboration of such mixed mesostructured/zeolite materials have thus been listed in the open literature. A first synthesis technique consists in synthesizing in a first stage a mesostructured aluminosilicate material according to the conventional methods described above, then, in a second stage, in impregnating this material with a structuring agent commonly used in the synthesis of zeolitic materials. A suitable hydrothermal treatment leads to a zeolitization of the amorphous walls of the initial mesostructured aluminosilicate (K. R. Koletstra, H. van Bekkum, J. C. Jansen, Chem. Commun., 1997, 2281; D. T. On, S. Kaliaguine, Angew. Chem. Int. Ed., 2001, 40, 3248; D. T. On, D. Lutic, S. Kaliaguine, Micropor. Mesopor. Mater., 2001, 44, 435; M. J. Verhoef, P. J. Kooyman, J. C. van der Waal, M. S. Rigutto, J. A. Peters, H. van Bekkum, Chem. Mater., 2001, 13, 683; S. Kaliaguine, D. T. On, U.S. Pat. No. 6,669,924B1, 2003). A second synthesis technique consists in bringing together a colloidal solution of zeolite seeds (also referred to as protozeolitic entities) and a surfactant commonly used to create a mesostructuration of the final material. The basic idea here is to simultaneously generate the elaboration of an inorganic matrix of organized mesoporosity and the growth, within this matrix, of zeolite seeds so as to ideally obtain a mesostructured aluminosilicate material with crystallized walls (Z. Zhang et al., J. Am. Chem. Soc., 2001, 123, 5014; Y. Liu et al., J. Am. Chem. Soc., 2000, 122, 8791). A variant of these two techniques consists in starting from a mixture of aluminium and silicon precursors in the presence of two structuring agents, one likely to generate a zeolitic system and the other likely to generate a mesostructuration. This solution is then subjected to two crystallization stages under variable hydrothermal treatment conditions, the first stage leading to the formation of the mesoporous structure of organized porosity and the second stage leading to the zeolitization of the amorphous walls (A. Karlsson, M. Stöcker, R. Schmidt, Micropor. Mesopor. Mater., 1999, 27, 181; L. Huang, W. Guo, P. Deng, Z. Xue, Q. Li, J. Phys., Chem. B, 2000, 104, 2817). All of these synthesis methods have the drawback of damaging the mesostructure and thus to lose the advantages thereof in cases where growth of the zeolite seeds or zeolitization of the walls is not perfectly controlled, which makes these techniques delicate to implement.

It can be noted that it is also possible to directly elaborate composite mesostructured/zeolite materials so as to take advantage of the catalytic properties specific to each one of these phases. This can be done through thermal treatment of a mixture of a zeolite seed solution and of a mesostructured aluminosilicate seed solution (P. Prokesova, S. Mintova, J. Cejka, T. Bein, Micropor. Mesopor. Mater., 2003, 64, 165) or through growth of a zeolite layer at the surface of a presynthesized mesostructured aluminosilicate (D. T. On, S. Kaliaguine, Angew. Chem. Int. Ed., 2002, 41, 1036).

To the exclusion of the mesoporous zeolitic materials obtained through post-treatment of a zeolite, we note that, from an experimental point of view, all these materials are obtained by direct precipitation of inorganic precursors in the presence or not of structuring agents within an aqueous solution or in polar solvents, this stage being in most cases followed by one or more ripening stages in an autoclave. The elementary particles usually obtained exhibit no regular shape and they are generally characterized by a size ranging between 200 and 500 nm, and often well above 500 nm.

In the case of non-zeolitic mesostructured materials, it is possible to achieve cooperative self-assembly of the structuring agent with the inorganic precursors hydrolyzed and condensed at various degrees of advancement by progressive evaporation of a solution of these reactants whose structuring agent concentration is below the critical micellar concentration ($c_{mc}$) known to the person skilled in the art, which leads to either the formation of mesostructured films in the case of deposition on a substrate (dip-coating technique), or to the formation of a mesostructured powder after atomization of the solution (aerosol technique). By way of example, patent U.S. Pat. No. 6,387,453 discloses the formation of mesostructured organic-inorganic hybrid films using the dip-coating technique; besides, these authors have used the aerosol technique to elaborate purely silicic mesostructured materials (C. J. Brinker, Y. Lu, A. Sellinger, H. Fan, *Adv. Mater.*, 1999, 11, 7).

SUMMARY OF THE INVENTION

The invention relates to a crystallized material with hierarchical and organized porosity within the microporosity and mesoporosity domains, consisting of at least two elementary spherical particles, each one of said particles comprising a matrix based on silicon oxide, mesostructured, having a mesopore size ranging between 1.5 and 30 nm and exhibiting microporous and crystallized walls of thickness ranging between 1 and 60 nm, which consist of zeolitic entities at the origin of the material microporosity, said elementary spherical particles having a maximum diameter of 200 microns. Said matrix based on silicon oxide optionally also comprises at least one element X selected from among aluminium, iron, boron, indium and gallium, preferably aluminium. The present invention also relates to the preparation of the material according to the invention.

A first method of preparing the material according to the invention comprises the following stages: a) preparing a clear solution containing the zeolitic entity precursor elements, i.e. at least one structuring agent, at least one silicic precursor and possibly at least one precursor of at least one element X selected from among aluminium, iron, boron, indium and gallium; b) mixing into a solution at least one surfactant and at least said clear solution obtained in stage a) such that the ratio of the volumes of inorganic and organic matter $V_{inorganic}/V_{organic}$ ranges between 0.26 and 4; c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a crystallized material with hierarchical and organized porosity in the microporosity and mesoporosity domains.

A second method of preparing the material according to the invention comprises the following stages: a') preparing, from at least one structuring agent, at least one silicic precursor and possibly at least one precursor of at least one element X selected from among aluminium, iron, boron, indium and gallium, a solution containing zeolite nanocrystals of maximum nanometric size equal to 60 nm in order to obtain a colloidal solution wherein said nanocrystals are dispersed; b') mixing into a solution at least one surfactant and at least said solution obtained in stage a') such that the ratio of the volumes of inorganic and organic matter $V_{inorganic}/V_{organic}$ ranges between 0.26 and 4; c') aerosol atomizing said solution obtained in stage b') so as to lead to the formation of spherical droplets; d') drying said droplets; and g') eliminating said structuring agent and said surfactant so as to obtain a crystallized material with hierarchical and organized porosity in the microporosity and mesoporosity domains.

According to a first variant of said second preparation method according to the invention, said stage d') is advantageously followed by a stage e') consisting in autoclaving the particles obtained in stage d'), then by a stage f') consisting in drying said particles obtained in stage e'), said stage f') being then followed by said stage g').

According to a second variant of said second preparation method according to the invention, stage b') is carried out by mixing into a solution at least one surfactant, at least said colloidal solution obtained in stage a') and at least one clear solution containing the zeolitic entity precursor elements, i.e. at least one structuring agent, at least one silicic precursor and possibly at least one precursor of at least one element X selected from among aluminium, iron, boron, indium and gallium. Said mixture is prepared under such conditions that the ratio of the volumes of inorganic and organic matter involved in this stage b') $V_{inorganic}/V_{organic}$ ranges between 0.26 and 4. According to this variant, stage d') of said second preparation method according to the invention is followed by a stage e') consisting in autoclaving the particles obtained in stage d'), then by a stage f') consisting in drying said particles obtained in stage e') prior to carrying out said stage g') described above for implementation of said second preparation method according to the invention.

A third method of preparing the material according to the invention comprises the following stages: a") redispersing into solution zeolite crystals so as to obtain a colloidal solution of zeolite nanocrystals of maximum nanometric size equal to 60 nm, b") mixing into a solution at least one surfactant, at least said colloidal solution obtained in a") and at least one clear solution containing the zeolitic entity precursor elements, i.e. at least one structuring agent, at least one silicic precursor and possibly at least one precursor of at least one element X selected from among aluminium, iron, boron, indium and gallium, said mixture being such that the ratio of the volumes of inorganic and organic matter $V_{inorganic}/V_{organic}$ ranges between 0.26 and 4; c") aerosol atomizing said solution obtained in stage b") so as to lead to the formation of spherical droplets; d") drying said droplets; e") autoclaving the particles obtained in d"); f") drying said particles obtained in e"), and g") eliminating said structuring agent and said surfactant so as to obtain a crystallized material with hierarchical and organized porosity in the microporosity and mesoporosity domains.

The microporosity induced by the crystallized walls of zeolitic nature of the material according to the invention results from the use of a clear solution comprising the zeolitic entity precursor elements according to stage a) and from jointly autoclaving the particles according to stage e') in the case of the first preparation method according to the invention, or from the use of a colloidal solution containing zeolite nanocrystals of maximum nanometric size equal to 60 nm according to stage a') and optionally from jointly autoclaving the particles according to stage e') in the case of the second preparation method according to the invention, or from the use of a colloidal solution containing zeolite nanocrystals of maximum nanometric size equal to 60 nm according to stage a') to which a clear solution according to stage b'') is added and from jointly autoclaving the particles according to stage e'') when the material according to the invention is prepared according to said third preparation method. Said solutions containing zeolite nanocrystals are obtained either in situ from at least one structuring agent, at least one silicic precursor and optionally at least one precursor of at least one element X selected from among aluminium, iron, boron, indium and gallium in the case of the second preparation method according to the invention (stage a')), or by redispersion into a solution of zeolite crystals in the case of the third preparation method according to the invention (stage a'')). Mesostructuration of the material according to the invention results from the micellization or the self-assembly through evaporation induced by the aerosol technique, according to stages c), c') and c'') respectively associated with the first, the second and the third method of preparing the material according to the invention, generated by the presence of the surfactant and of the inorganic phase from the solutions obtained in stages b), b') and b'') of each one of the three methods of preparing the material according to the invention.

The material according to the invention that comprises a mesostructured inorganic matrix, based on silicon oxide, with microporous and crystallized walls, simultaneously exhibits the structural, textural and acidobasicity properties specific to the materials of the zeolite family and to the mesostructured materials. Preferably, the matrix based on silicon oxide forming each one of the elementary spherical particles of the material according to the invention comprises, in addition to silicon, at least one element X selected from among aluminium, iron, boron, indium and gallium, preferably aluminium, so as to form a crystallized aluminosilicate matrix. The material according to the invention then exhibits, when X is aluminium, greater acidobasicity properties than the aluminosilicate materials with amorphous walls, devoid of crystallized zeolitic entities, and prepared according to synthesis protocols known to the person skilled in the art using inorganic silica and alumina precursors. Besides, the presence, within the same spherical particle of micrometric or even nanometric size, of mesopores organized in a microporous and crystallized inorganic matrix leads to preferential access of the reactants and the reaction products to the microporous sites when the material according to the invention is used in potential industrial applications.

Furthermore, the material according to the invention consists of spherical elementary particles, the diameter of these particles being maximum 200 μm, preferably less than 100 μm, advantageously ranging between 50 nm and 20 μm, more advantageously between 50 nm and 10 μm and most advantageously between 50 nm and 3 μm. The limited size of these particles and their homogeneous spherical size provides better diffusion of the reactants and of the reaction products when the material according to the invention is used in potential industrial applications by comparison with materials known from the prior art that come in form of elementary particles of non-homogeneous shape, i.e. irregular, and of size often well above 500 nm.

DETAILED DESCRIPTION

The object of the present invention is a material with hierarchical and organized porosity in the microporosity and mesoporosity domains, consisting of at least two elementary spherical particles, each one of said particles comprising a matrix based on silicon oxide, mesostructured, having a mesopore diameter ranging between 1.5 and 30 nm and exhibiting microporous and crystallized walls of thickness ranging between 1 and 60 nm, said elementary spherical particles having a maximum diameter of 200 microns.

What is understood to be a material with hierarchical and organized porosity in the sense of the present invention is a material having a double porosity on the scale of each one of said spherical particle: a mesoporosity, i.e. the presence of pores organized on the mesoporous scale having a uniform diameter ranging between 1.5 and 30 nm, preferably between 2 and 20 nm, homogeneously and evenly distributed in each one of said particles (mesostructuration), and a microporosity of zeolitic type whose characteristics (structural type of the zeolite, chemical composition of the zeolite framework) depend on the constituent zeolitic entities of the crystallized walls of the matrix of each spherical particle of the material according to the invention. The material according to the invention also exhibits an intraparticular textural macroporosity. It can be noted that a porosity of microporous nature can also result from the imbrication of the surfactant used to prepare the material according to the invention with the inorganic wall at the level of the organic-inorganic interface developed upon mesostructuration of the inorganic component of said material according to the invention. Advantageously, none of the spherical particles making up the material according to the invention has macropores.

The matrix based on silicon oxide, contained in each spherical particle that makes up the material according to the invention, is mesostructured: it exhibits mesopores having a uniform diameter, i.e. identical for each mesopore, ranging between 1.5 and 30 nm, preferably between 2 and 20 nm, homogeneously and evenly distributed in each spherical particle. The matter between the mesopores of each one of said spherical particles is microporous and crystallized, and it forms walls whose thickness ranges between 1 and 60 nm, preferably between 1 and 30 nm. The thickness of the walls corresponds to the distance between a first mesopore and a second mesopore, the second mesopore being the pore that is the closest to said first mesopore. The organization of the mesoporosity described above leads to a structuration of the matrix based on silicon oxide, which can be hexagonal, vermicular or cubic, preferably vermicular. The mesostructuration of the material according to the invention can be of vermicular, hexagonal or cubic type depending on the nature of the surfactant used for preparing said material.

In accordance with the invention, the matrix based on silicon oxide forming each of the spherical particles of the material according to the invention has crystallized walls exclusively consisting of zeolitic entities that are at the origin of the microporosity present within each spherical particle of the material according to the invention. Any zeolite and in particular, but in a non-exhaustive manner, those listed in "*Atlas of zeolite framework types*", 5$^{th}$ revised Edition, 2001, C. Baerlocher, W. M. Meier, D. H. Olson can be used to form the zeolitic entities that exclusively make up the crystallized walls of the matrix of each particle of the material according to the invention from the moment that bringing into solution the precursor elements of these entities, i.e. at least one structuring agent, at least one silicic precursor and optionally at least one precursor of at least one element X selected from among aluminium, iron, boron, indium and gallium, preferably aluminium, according to stage a) of the first preparation method of the invention described hereafter, obtaining zeolite nanocrystals of maximum nanometric size equal to 60 nm from at least one structuring agent, at least one silicic precursor and optionally at least one precursor of at least one element X selected from among aluminium, iron, boron, indium and gallium according to stage a') of the preparation method according to the invention described hereafter, and redispersing into solution zeolite crystals according to stage a") of the third preparation method of the invention as described hereafter leads to a stable solution, i.e. clear or colloidal, and atomizable. The zeolitic entities that exclusively make up the crystallized walls of the matrix of each particle of the material according to the invention and at the origin of the microporosity thereof preferably comprise at least one zeolite selected from among the following zeolites: ZSM-5, ZSM-48, ZSM-22, ZSM-23, ZBM-30, EU-2, EU-11, Silicalite, Beta, zeolite A, Faujasite, Y, USY, VUSY, SDUSY, mordenite, NU-87, NU-88, NU-86, NU-85, IM-5, IM-12, Ferrierite and EU-1. More preferably, said zeolitic entities that make up the crystallized walls of the matrix of each particle of the material according to the invention comprise at least one zeolite selected from among the zeolites of MFI, BEA, FAU and LTA structural type.

In accordance with the invention, the matrix based on silicon oxide forming each of the elementary spherical particles of the material according to the invention is either entirely silicic or it comprises, in addition to silicon, at least one element X selected from among aluminium, iron, boron, indium and gallium, preferably aluminium. Thus, the zeolitic entities that make up the crystallized walls of the matrix of each particle of the material according to the invention and at the origin of the microporosity thereof comprise at least one zeolite either entirely silicic or comprising, in addition to silicon, at least one element X selected from among aluminium, iron, boron, indium and gallium, preferably aluminium. When X is aluminium, the matrix of the material is in this case a crystallized aluminosilicate.

The mesostructuration of the material according to the invention is such that said mesostructured matrix has a hexagonal, cubic or vermicular structure depending on the nature of the surfactant used for the material according to the invention.

In accordance with the invention, said elementary spherical particles making up the material according to the invention have a maximum diameter of 200 microns, preferably less than 100 microns, advantageously ranging between 50 nm and 20 µm, more advantageously ranging between 50 nm and 10 µm, and most advantageously ranging between 50 and 3 µm. More precisely, they are present in the material according to the invention in form of aggregates.

The material according to the invention advantageously has a specific surface area ranging between 100 and 1100 m²/g, more advantageously between 250 and 1000 m²/g.

The material according to the invention advantageously has a mesoporous volume measured by nitrogen volumetric analysis ranging between 0.01 and 1 ml/g and a microporous volume measured by nitrogen volumetric analysis ranging between 0.01 and 0.4 ml/g.

The object of the present invention also is the preparation of the material according to the invention.

A first method of preparing the material according to the invention comprises the following stages: a) preparing a clear solution containing the zeolitic entity precursor elements, i.e. at least one structuring agent, at least one silicic precursor and possibly at least one precursor of at least one element X selected from among aluminium, iron, boron, indium and gallium; b) mixing into a solution at least one surfactant and at least said clear solution obtained in stage a) such that the ratio of the volumes of inorganic and organic matter $V_{inorganic}/V_{organic}$ ranges between 0.26 and 4; c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a crystallized material with hierarchical and organized porosity in the microporosity and mesoporosity domains.

A second method of preparing the material according to the invention comprises the following stages: a') preparing, from at least one structuring agent, at least one silicic precursor and optionally at least one precursor of at least one element X selected from among aluminium, iron, boron, indium and gallium, a solution containing zeolite nanocrystals of maximum nanometric size equal to 60 nm so as to obtain a colloidal solution wherein said nanocrystals are dispersed; b') mixing into a solution at least one surfactant and at least said solution obtained in stage a') such that the ratio of the volumes of inorganic and organic matter $V_{inorganic}/V_{organic}$ ranges between 0.26 and 4; c') aerosol atomizing said solution obtained in stage b') so as to lead to the formation of spherical droplets; d') drying said droplets; and g') eliminating said structuring agent and said surfactant so as to obtain a crystallized material with hierarchical and organized porosity in the microporosity and mesoporosity domains.

According to a first variant of said second preparation method according to the invention, said stage d') is advantageously followed by a stage e') consisting in autoclaving the particles obtained in stage d'), then by a stage f') consisting in drying said particles obtained in stage e'), said stage f') being then followed by said stage g').

According to a second variant of said second preparation method according to the invention, stage b') is carried out by mixing into a solution at least one surfactant, at least said colloidal solution obtained in stage a') and at least one clear solution containing the zeolitic entity precursor elements, i.e. at least one structuring agent, at least one silicic precursor and possibly at least one precursor of at least one element X selected from among aluminium, iron, boron, indium and gallium. Said mixture is prepared under such conditions that the ratio of the volumes of inorganic and organic matter involved in this stage b') $V_{inorganic}/V_{organic}$ ranges between 0.26 and 4. According to this variant, stage d') of said second preparation method according to the invention is followed by a stage e') consisting in autoclaving the particles obtained in stage d'), then by a stage f') consisting in drying said particles obtained in stage e') prior to carrying out said stage g') described above for implementation of said second preparation method according to the invention.

A third method of preparing the material according to the invention comprises the following stages: a") redispersing into a solution zeolite crystals so as to obtain a colloidal solution of zeolite nanocrystals of maximum nanometric size equal to 60 nm, b") mixing into a solution at least one surfactant, at least said colloidal solution obtained in a") and at least one clear solution containing the zeolitic entity precursor elements, i.e. at least one structuring agent, at least one silicic precursor and possibly at least one precursor of at least one element X selected from among aluminium, iron, boron, indium and gallium, said mixture being such that the ratio of the volumes of inorganic and organic matter $V_{inorganic}/V_{organic}$ ranges between 0.26 and 4; c") aerosol atomizing said solution obtained in stage b") so as to lead to the formation of spherical droplets; d") drying said droplets; e") autoclaving the particles obtained in d"); f") drying said particles obtained in e"), and g") eliminating said structuring agent and said surfactant so as to obtain a crystallized material with hierarchical and organized porosity in the microporosity and mesoporosity domains.

The clear solution containing the zeolitic entity precursor elements prepared in stage a) of the first preparation method according to the invention, stage b') of the second variant of the second preparation method according to the invention and stage b") of the third preparation method according to the invention, and the colloidal solution containing zeolite nanocrystals of maximum nanometric size equal to 60 nm prepared in stages a') and a") of the second and third preparation methods according to the invention respectively are prepared from operating protocols known to the person skilled in the art.

The silicic precursor used for carrying out stages a), a') and b") respectively of the first, second and third preparation methods according to the invention and for carrying out stage b') of the second variant of the second preparation method according to the invention is selected from among the silicon oxide precursors known to the person skilled in the art. In particular, a silicic precursor selected from among the silica precursors commonly used in the synthesis of zeolites is advantageously used, for example powdered solid silica, silicic acid, colloidal silica, dissolved silica or tetraethoxysilane, also referred to as tetraethylorthosilicate (TEOS). The silicic precursor preferably is TEOS.

The precursor of element X, optionally used for carrying out stages a), a') and b") respectively of the first, second and third preparation methods according to the invention and for carrying out stage b') of the second variant of the second preparation method according to the invention can be any compound comprising element X and that can release this element in solution, notably in aqueous or aquo-organic solution, in reactive form. In the preferred case where X is aluminium, the aluminic precursor advantageously is an inorganic aluminium salt of formula $AlZ_3$, Z being a halogen, a nitrate or a hydroxide. Preferably, Z is chlorine. The aluminic precursor can also be an aluminium sulfate of formula $Al_2(SO_4)_3$. The aluminic precursor can also be an organometallic precursor of formula $Al(OR)_3$ where R=ethyl, isopropyl, n-butyl, s-butyl $(Al(O^sC_4H_9)_3)$ or t-butyl or a chelated precursor such as aluminium acetylacetonate $(Al(C_5H_8O_2)_3)$. Preferably, R is s-butyl. The aluminic precursor can also be sodium or ammonium aluminate, or alumina proper, in one of its crystalline phases known to the person skilled in the art (alpha, delta, teta, gamma), preferably in hydrated form or in a form that can be hydrated.

It is also possible to use mixtures of the aforementioned precursors. Some or all of the aluminic and silicic precursors can optionally be added in form of a single compound comprising both aluminium atoms and silicon atoms, an amorphous silica alumina for example.

The structuring agent used for carrying out stages a), a') and b") respectively of the first, second and third preparation methods according to the invention and for carrying out stage b') of the second variant of the second preparation method according to the invention can be ionic or neutral depending on the zeolite to be synthesized. The structuring agents from the following non-exhaustive list are frequently used: nitrogen-containing organic cations such as tetrapropylammonium (TPA), elements from the alkaline family (Cs, K, Na, etc.), crown ethers, diamines, as well as any other structuring agent known to the person skilled in the art for zeolite synthesis.

The clear solution containing zeolitic entity precursor elements (stage a) of the first preparation method according to the invention, stage b') of the second variant of the second preparation method according to the invention and stage b") of the third preparation method according to the invention) and the colloidal solution (stage a') of the second preparation method according to the invention, stage a") of the third preparation method according to the invention containing zeolite nanocrystals, used for carrying out the various stages of the various preparation methods of the invention, are synthesized according to operating protocols known to the person skilled in the art. In particular, clear solutions containing precursor elements of beta type zeolite entities or colloidal solutions containing beta type zeolite nanocrystals are prepared from the operating protocol described by P. Prokesova, S. Mintova, J. Cejka, T. Bein et al., *Micropor. Mesopor. Mater.,* 2003, 64, 165. Clear solutions containing precursor elements of FAU type zeolites entities or colloidal solutions containing FAU type zeolite nanocrystals are prepared from the operating protocols described by Y. Liu, W. Z. Zhang, T. J. Pinnavaia et coll., *J. Am. Chem. Soc.,* 2000, 122, 8791, and K. R. Kloetstra, H. W. Zandbergen, J. C. Jansen, H. van Bekkum, *Microporous Mater.,* 1996, 6, 287. Clear solutions containing precursor elements of ZSM-5 type zeolite entities or colloidal solutions containing ZSM-5 type zeolite nanocrystals are prepared according to the operating protocol described by A. E. Persson, B. J. Schoeman, J. Sterte, J.-E. Otterstedt, *Zeolites,* 1995, 15, 611. In the particular case of a purely silicic material, clear solutions containing the precursor elements of silicalite type zeolite entities or colloidal solutions containing silicalite type zeolite nanocrystals are advantageously prepared from the operating protocol described by A. E. Persson, B. J. Schoeman, J. Sterte, J.-E. Otterstedt, *Zeolites,* 1994, 14, 557.

The clear solution containing the zeolitic entity precursor elements is generally obtained according to stages a), b') and b") respectively of the first, second variant of the second and third preparation methods according to the invention, or the colloidal solution containing zeolite nanocrystals of maximum nanometric size equal to 60 nm is generally obtained according to stage a') of the second preparation method according to the invention, by preparing a reaction mixture comprising at least one silicic precursor, optionally at least one precursor of at least one element X selected from among aluminium, iron, boron, indium and gallium, preferably at least one aluminic precursor, and at least one structuring agent. The reaction mixture is either aqueous or aquo-organic, a water-alcohol mixture for example.

In accordance with stage a) of the first preparation method according to the invention, the reaction mixture can be subjected to hydrothermal conditions under autogenous pressure, optionally by adding a gas, nitrogen for example, at a temperature ranging between ambient temperature and 200° C., preferably between ambient temperature and 170° C., more preferably at a temperature that does not exceed 120° C. until formation of a clear solution containing the precursor elements of the zeolitic entities that exclusively make up the crystallized walls of the matrix of each spherical particle of the material according to the invention. According to a preferred method of operation, the reaction mixture containing at least one structuring agent, at least one silicic precursor and optionally at least one precursor of at least one element X selected from among aluminium, iron, boron, indium and gallium is ripened at ambient temperature, for a duration advantageously ranging between 15 and 20 hours, so as to obtain a clear solution containing the precursor elements of zeolite entities likely to generate the formation of crystallized zeolitic entities during autoclaving stage e) of the material preparation method according to the invention. The clear solution containing zeolitic entity precursors according to stage b') of the second variant of said second preparation method according to the invention and that according to stage b") of said third preparation method according to the invention are advantageously prepared in the same way as said clear solution containing zeolite entity precursors according to stage a) of said first preparation method according to the invention.

In accordance with stage a') of the second method according to the invention, the reaction mixture is advantageously subjected to hydrothermal conditions under autogenous pressure, optionally by adding a gas, nitrogen for example, at a temperature ranging between 50° C. and 200° C., preferably between 60° C. and 170° C., more preferably at a temperature ranging between 60° C. 120° C. until formation of zeolite nanocrystals of maximum nanometric size equal to 60 nm. The reaction mixture is preferably ripened at a temperature ranging between 70° C. and 100° C. for a duration ranging between 3 and 6 days. At the end of said hydrothermal treatment, a colloidal solution wherein said nanocrystals are in the disperse state is obtained. Synthesis of said zeolite nanocrystals is followed by wide-angle X-ray diffraction and the size of said nanocrystals is controlled by light scattering and by transmission electron microscopy. The person skilled in the art knows how to adjust the operating conditions so as to obtain said colloidal solution wherein said nanocrystals, of maximum nanometric size equal to 60 nm, are in the disperse state.

A basic reaction medium is preferably used for the various stages of the first and second preparation methods according to the invention in order to favour the development of the zeolitic entities making up the crystallized walls of the matrix of each particle of the material according to the invention. The basicity of the clear solution according to stage a) of said first preparation method or of the colloidal solution according to stage a') of said second preparation method according to the invention or of the clear solution according to stage b') of the second variant of said second preparation method according to the invention is advantageously provided by the basicity of the structuring agent used or by basification of the reaction mixture by addition of a basic compound, for example an alkaline metal hydroxide, preferably sodium hydroxide, in stage a), a') or b').

In accordance with stage a") of the third preparation method according to the invention, zeolite crystals are used. The size of said zeolite crystals can be above 60 nm. Any crystallized zeolite known from the prior art that has the property of dispersing in a solution, an aquo-organic solution for example, in form of nanocrystals of maximum nanometric size equal to 60 nm, is suitable for carrying out stage a"). Dispersion of said zeolite crystals is achieved by any method known to the person skilled in the art, by sonication for example. In particular, said zeolite nanocrystals can be purely silicic or contain, in addition to silicon, at least one element X selected from among aluminium, iron, boron, indium and gallium, preferably aluminium. Said zeolite crystals are synthesized using methods known to the person skilled in the art. The zeolite crystals used in stage a") can already come in form of nanocrystals. It is also possible to obtain zeolite crystals that disperse in form of nanocrystals of maximum nanometric size equal to 60 nm by functionalizing the surface of the nanocrystals. The zeolite crystals used are either in their raw synthesis form, i.e. still containing the structuring agent, or in their calcined form, i.e. freed of said structuring agent. When the zeolite crystals used are in their raw synthesis form, said structuring agent is eliminated in stage g") of the third preparation method according to the invention.

In accordance with stage b), stage b') and stage b") respectively of the first, second and third material preparation method according to the invention, the surfactant used is an ionic or a non-ionic surfactant or a mixture thereof. Preferably, the ionic surfactant is selected from among anionic surfactants such as sulfates, like for example sodium dodecylsulfate (SDS). Preferably, the non-ionic surfactant can be any copolymer having at least two parts of different polarities conferring amphiphilic macromolecule properties on them. These copolymers can comprise at least one block belonging to the non-exhaustive list of the following polymer families: fluorinated polymers ($-[CH_2-CH_2-CH_2-CH_2-O-CO-R1-$ with $R1=C_4F_9, C_8F_{17}$, etc.), biological polymers such as polyamino acids (poly-lysine, alginates, etc.), dendrimers, polymers consisting of poly(alkylene oxide) chains. Any other copolymer of amphiphilic character known to the person skilled in the art can be used if it allows to obtain a stable solution, i.e. clear or colloidal, in stages b), b') and b") respectively of the first, second and third preparation methods according to the invention, such as poly(styrene-b-acrylamide) for example (S. Förster, M. Antionnetti, *Adv. Mater,* 1998, 10, 195-217; S. Förster, T. Plantenberg, *Angew. Chem. Int. Ed,* 2002, 41, 688-714; H. Cölfen, *Macromol. Rapid Commun,* 2001, 22, 219-252). Preferably, a block copolymer consisting of poly(alkylene oxide) chains is used within the scope of the present invention. Said block copolymer is preferably a block copolymer having two, three or four blocks, each block consisting of a poly(alkylene oxide) chain. For a two-block copolymer, one of the block consists of a poly(alkylene oxide) chain of hydrophilic nature and the other block consists of a poly(alkylene oxide) chain of hydrophobic nature. For a three-block copolymer, at least one of the blocks consists of a poly(alkylene oxide) chain of hydrophilic nature whereas at least one of the other blocks consists of a poly(alkylene oxide) chain of hydrophobic nature. Preferably, in the case of a three-block copolymer, the poly(alkylene oxide) chains of hydrophilic nature are poly(ethylene oxide) chains denoted by $(PEO)_x$ and $(PEO)_z$, and the poly(alkylene oxide) chains of hydrophobic nature are poly(propylene oxide) chains denoted by $(PPO)_y$, poly(butylene oxide) chains or mixed chains each chain of which is a mixture of several alkylene oxide monomers. More preferably, in the case of a three-block copolymer, it consists of two poly(ethylene oxide) chains and of one poly(propylene oxide) chain. More precisely, a compound of formula $(PEO)_x-(PPO)_y-(PEO)_z$ where x ranges between 5 and 300, y ranges between 33 and 300, and z ranges between 5 and 300 is used. Preferably, the values of x and z are identical. A compound wherein x=20, y=70 and z=20 (P123) and a compound wherein x=106, y=70 and z=106 (F127) are very advantageously used. The commercial non-ionic surfactants known as Pluronic (BASF), Tetronic (BASF), Triton (Sigma), Tergitol (Union Carbide) and Brij (Aldrich) can be used as non-ionic surfactants in stages b), b') and b") respectively of the first, second and third preparation method according to the invention. For a four-block copolymer, two of the blocks consist of a poly(alkylene oxide) chain of hydrophilic nature and the other two blocks consist of a poly(alkylene oxide) chain of hydrophobic nature.

The solution obtained at the end of stages b), b') and b") respectively of the first, second and third preparation method according to the invention can be acid, neutral or basic. Preferably, said solution is basic and it preferably has a pH value above 9, this pH value being generally imposed by the pH value of the clear solution containing the precursor elements of zeolitic entities obtained according to stage a) of the first material preparation method according to the invention, or of the colloidal solution containing zeolite nanocrystals of maximum nanometric size equal to 60 nm according to stages a') and a") respectively of said second and third material preparation method of the invention. The solution obtained at the end of stages b), b') and b") can be aqueous or it can be a mixture of water and organic solvent, the organic solvent preferably being a polar solvent, notably an alcohol, preferably ethanol.

The amount of organic compounds, i.e. of surfactant and of structuring agent, present in the mixture in accordance with stages b), b') and b") respectively of the first, second and third preparation methods according to the invention is defined in relation to the amount of inorganic matter present in said mixture after adding the clear solution containing the precursor elements of zeolitic entities according to stage a) of the first preparation method according to the invention, or after adding the colloidal solution containing zeolite nanocrystals of maximum nanometric size equal to 60 nm according to stage a') of the second preparation method of the invention, and optionally after adding the clear solution according to stage b') if the material according to the invention is prepared according to the second variant of said second preparation method, or after adding the colloidal solution containing zeolite nanocrystals of maximum nanometric size equal to 60 nm according to stage a") and the clear solution introduced in stage b") of the third preparation method according to the invention. The amount of inorganic matter corresponds to the amount of matter of the silicic precursor and of the precursor of element X when it is present. The $V_{inorganic}/V_{organic}$ volume ratio is such that the organic-inorganic binary system formed during atomization stages c), c') and c") respectively of the first, second and third preparation method according to the invention undergoes a mesostructuration process through self-assembly of the surfactant jointly with the hydrolysis/condensation reactions of the various inorganic precursors. Said $V_{inorganic}/V_{organic}$ volume ratio is defined as follows: $V_{inorganic}/V_{organic}=(m_{inorg}*\rho_{org})/(m_{org}*\rho_{inorg})$ with $M_{inorg}$ the final mass of the inorganic fraction in form of condensed oxide(s) in the solid elementary particle obtained by atomization, $m_{org}$ the total mass of the non-volatile organic fraction found in the solid elementary particle obtained by atomization, $\rho_{org}$ and $\rho_{inorg}$ the densities respectively associated with the non-volatile organic and inorganic fractions. Within the scope of the invention, when element X is aluminium and for calculation simplification (approximations valid for a large majority of non-volatile organic fraction and for an inorganic fraction of "aluminosilicate network" type), we consider that $\rho_{org}=1$ and $\rho_{inorg}=2$. Within the scope of the invention, $m_{inorg}$ generally corresponds to the mass of $SiO_2$ to which the mass of $AlO_2$ is added when X is aluminium, and $m_{org}$ corresponds to the mass of the structuring agent, TPAOH for example, to which the mass of the surfactant, surfactant F127 for example, is added. The polar solvent, preferably ethanol, as well as water and soda, are not taken into account in the calculation of said ratio $V_{inorganic}/V_{organic}$. The species comprising an element X, preferably the aluminic species optionally introduced, for the preparation of the material according to the invention, after carrying out said stage b), b') or b") respectively of the first, second or third preparation method of the invention, are not taken into account for the calculation of ratio $V_{inorganic}/V_{organic}$ defined above. In accordance with the invention, the amount of organic matter and the amount of inorganic matter in the mixture obtained after carrying out stage b), b') and b") respectively of the first, second and third preparation method according to the invention is such that ratio $V_{inorganic}/V_{organic}$ ranges between 0.26 and 4, preferably between 0.3 and 2. In accordance with stages b), b') and b") respectively of the first, second and third preparation method according to the invention, the initial concentration of the surfactant introduced in the mixture, defined by $c_0$, is such that $c_0$ is less than or equal to $c_{mc}$, parameter $c_{mc}$ representing the critical micellar concentration known to the person skilled in the art, i.e. the limit concentration beyond which the phenomenon of self-assembly of the surfactant molecules occurs in the solution obtained after stages b), b') and b") respectively of the first, second and third preparation method according to the invention. Prior to atomization, the surfactant molecule concentration of the solution obtained after stages b), b') and b") respectively of the first, second and third preparation method according to the invention does therefore not lead to the formation of particular micellar phases. In a preferred embodiment of the various preparation methods according to the invention, concentration $c_0$ is less than $c_{mc}$, ratio $V_{inorganic}/V_{organic}$ is such that the composition of the binary system verifies the composition conditions for which a mesostructuration mechanism takes place through cooperative self-assembly of the reactants ($V_{inorganic}/V_{organic}$ ranging between 0.26 and 4, preferably between 0.3 and 2) and said solution sought in stages b), b') and b") respectively of the first, second and third preparation method according to the invention is a basic water-alcohol mixture.

The mixture atomization stage according to stages c), c') and c") respectively of the first, second and third preparation methods according to the invention produces spherical droplets. The size distribution of these droplets is of lognormal type. The aerosol generator used here is a commercial device of 9306 A type provided by TSI having a 6-jet atomizer. Atomization of the solution occurs in a chamber into which a carrier gas, a $O_2/N_2$ mixture (dry air), is sent at a pressure P of 1.5 bar.

In accordance with stages d), d') and d") respectively of the first, second and third preparation method according to the invention, said droplets are dried. Drying is carried out through the transportation of said droplets via the carrier gas, the $O_2/N_2$ mixture, in PVC tubes, which leads to the progressive evaporation of the solution, for example the aquo-organic solution, preferably the basic aquo-organic solution obtained during stages b), b') and b") respectively of the first, second and third preparation method according to the invention, and thus to the formation of spherical elementary particles. This drying procedure is completed by passage of said particles through an oven whose temperature can be adjusted, the usual temperature ranging between 50° C. and 600° C., preferably between 80° C. and 400° C., the residence time of the particles in the oven being of the order of one second. The particles are then recovered in a filter. A pump arranged at the end of the circuit favours delivery of the species in the aerosol experimental device. Drying of the droplets according to stages d), d') and d") respectively of the first, second and third preparation method of the invention is advantageously followed by passage through a stove at a temperature ranging between 50° C. and 150° C.

In accordance with stages e), e') and e") of the first and of the variant(s) of the second and third preparation method according to the invention, the dried particles obtained in stages d), d') and d") of the three different preparation methods according to the invention can be autoclaved in the presence of a solvent. This stage consists in placing said particles in an enclosure in the presence of a solvent at a given temperature so as to operate under autogenous pressure inherent in the operating conditions selected. The solvent used is advantageously a protic polar solvent. Preferably, the solvent used is water. The volume of solvent introduced is defined in relation to the volume of the autoclave selected, the mass of dry powder introduced and the treating temperature. Thus, the volume of solvent introduced ranges between 0.01 and 20% of the volume of the autoclave selected, preferably between 0.05 and 5%, and more preferably between 0.05 and 1%. The autoclaving temperature ranges between 50° C. and 200° C., preferably between 60° C. and 170° C., and more preferably between 60° C. and 120° C. so as to allow growth of zeolitic entities in the walls of the matrix of each particle of the material according to the invention without generating too large zeolite crystals that would disorganize the mesostructuration of each particle of the material according to the invention. Autoclaving is continued for 1 to 196 hours, preferably for 10 to 72 hours.

In accordance with stages f), f') and f") respectively of the first and of the variant(s) of the second and third preparation method according to the invention, drying of the particles after autoclaving is advantageously carried out in a stove at a temperature ranging between 50° C. and 150° C.

In the particular case where element X optionally used for preparing the material according to the invention is aluminium and where the element sodium is present in the solution obtained in accordance with stages a) and a') respectively of the first and second preparation method according to the invention via the use of sodium hydroxide and/or of a sodium-containing structuring agent providing the basicity of said solution, or present in the precursor zeolite crystals of stage a") of the third method according to the invention, an additional stage of ionic exchange allowing the $Na^+$ cation to be exchanged for the $NH_4^+$ cation between stages f) and g) is preferably carried out if the material according to the invention is prepared according to said first preparation method, between stages f') and g') if the material according to the invention is prepared according to one of the variant of said second preparation method, and between stages f") and g") if the material according to the invention is prepared according to said third preparation method. This exchange, which leads to the formation of $H^+$ protons after stages g), g') and g") respectively of the first, second and third preparation method of the invention in the preferred case where elimination of the structuring agent and of the surfactant is performed by calcination in air, is carried out according to operating protocols known to the person skilled in the art. One of the usual methods consists in suspending the dried solid particles from stages f), d') and f") respectively of the first, second and third preparation method of the invention and of stage f') of one of the variants of the second preparation method of the invention if it is carried out, in an aqueous solution of ammonium nitrate. The assembly is then brought to reflux for 1 to 6 hours. The particles are thereafter recovered by filtering (9000 rpm centrifugation), washed and then dried through passage in the stove at a temperature ranging between 50° C. and 150° C. This ion exchange/washing/drying cycle can be repeated several times and preferably two more times. This exchange cycle can also be performed after stages f) and g) of said first preparation method according to the invention, after stages d') and g') of one of the variants of said second preparation method and after stages f") and g") of said third preparation method. Under these conditions, stages g), g') and g") respectively of the first, second and third preparation methods according to the invention are then repeated after the last exchange cycle so as to generate the $H^+$ protons as explained above.

In accordance with stages g), g') and g") respectively of the first, second and third preparation methods of the invention, elimination of the structuring agent and of the surfactant in order to obtain the crystallized material according to the invention with hierarchical and organized porosity in the microporosity and mesoporosity domains is advantageously carried out by means of chemical extraction methods or thermal treatment, preferably by calcination in air in a temperature range between 300° C. and 1000° C., preferably between 400° C. and 600° C., for 1 to 24 hours, preferably for 2 to 12 hours.

If the solution prepared in stages b), b') and b") respectively of the first, second and third methods according to the invention is a water-organic solvent mixture, preferably basic, it is essential that, during stages b), b') and b"), the surfactant concentration at the origin of the matrix mesostructuration be lower than the critical micellar concentration and that ratio $V_{inorganic}/V_{organic}$ ranges between 0.26 and 4, preferably between 0.3 and 2, so that the evaporation of said aquo-organic solution, preferably basic, during stages c), c') and c") respectively of the first, second and third method according to the invention by means of the aerosol technique induces a phenomenon of micellization or of self-assembly leading to the mesostructuration of the matrix of the material according to the invention. When $c_0<c_{mc}$, the mesostructuration of the matrix of the material according to the invention is the result of a progressive concentration, within each droplet, of the zeolitic entity precursor elements of the clear solution obtained in stage a) of the first preparation method according to the invention or of the zeolite nanocrystals of the colloidal solution obtained in stage a') of said second preparation method according to the invention, or of the zeolite nanocrystals of the colloidal solution obtained in stage a') and of the zeolitic entity precursor elements of the clear solution obtained in stage b') of the second variant of said second preparation method, or of the zeolite nanocrystals of the colloidal solution obtained in stage b") of said third preparation method according to the invention and of at least one surfactant introduced during stages b), b') and b") of the three preparation methods according to the invention, up to a surfactant concentration $c>c_{mc}$ resulting from an evaporation of the aquo-organic solution.

According to a first preferred embodiment of each one of the three preparation methods of the invention, at least one precursor of at least one element X selected from among aluminium, iron, boron, indium and gallium, preferably aluminium, is introduced to carry out stage b) of the first preparation method of the invention, stage b') of the second preparation method of the invention, stage b') of one of the variants of said second preparation method of the invention or stage b") of said third preparation method of the invention. Thus, mixing into a solution at least one surfactant and at least said clear solution obtained according to stage a) of the first method of the invention, or at least one surfactant and at least said colloidal solution obtained according to stage a') of the second method of the invention, or at least one surfactant, at least said colloidal solution obtained according to stage a') and at least said clear solution obtained according to stage b') of the second variant of said second preparation method, or at least one surfactant, at least said colloidal solution obtained according to stage a") and at least said clear solution obtained according to stage b") of said third preparation method, is carried out in the presence of at least one precursor of said element X selected from among the aforementioned precursors of said element X, preferably the aluminic precursors described above in the present description, for example for carrying out said stage a) of said first preparation method according to the invention. In accordance with said first preferred embodiment of each one of the three preparation methods of the invention, preparation of the clear solution according to stage a), stage b') or stage b") respectively of the first, second variant of the second or third preparation method of the invention and preparation of the colloidal solution according to stage a') of said second preparation method are carried out either in the presence or in the absence of at least one precursor of at least one element X.

According to a second preferred embodiment of each one of the three preparation methods of the invention, at least one precursor of at least one element X selected from among aluminium, iron, boron, indium and gallium, preferably aluminium, is introduced either while carrying out said stage d) and/or said stage f) and/or said stage g) of said first preparation method of the invention, or while carrying out said stage d') and/or said stage g') of said second preparation method according to the invention, or while carrying out said stage d') and/or said stage f') and/or said stage g') of one of the variants of said second preparation method of the invention, or while carrying out said stage d") and/or said stage f") and/or said stage g") of said third preparation method of the invention, in order to produce a surface modification of the material according to the invention. According to said second preferred embodiment of each one of the three preparation methods of the invention, said precursor of at least one element X, preferably the aluminic precursor, is introduced while carrying out at least one of the aforementioned stages (d, d', d", f, f', f", g, g' and g") by means of any surface modification technique known to the person skilled in the art, such as grafting at least one precursor of at least one element X, dry impregnation of at least one precursor of at least one element X and excess impregnation of at least one precursor of at least one element X. Said precursor of at least one element X, preferably an aluminic precursor, introduced while carrying out at least one of the aforementioned stages (d, d', d", f, f', f", g, g' and g") by means of a surface modification technique is selected from among the precursors of said element X, preferably the aluminic precursors described above in the present description, for example those used for carrying out said stage a) of said first preparation method of the invention. According to said second preferred embodiment of each one of the three preparation methods of the invention, stage a) and stage a') of the first and of the second preparation method of the invention are carried out in the presence or in the absence of at least one precursor of at least one element X, preferably an aluminic precursor, and stage b), stage b') or stage b") respectively of the first, second or third preparation method of the invention is carried out in the presence or in the absence of at least one precursor of at least one element X, preferably an aluminic precursor.

According to the three material preparation methods of the invention, said first preferred embodiment of each one of the three preparation methods of the invention and said second preferred embodiment of each one of the three preparation methods of the invention are only optional variants of each one of the three material preparation methods of the invention. Thus, when the mesostructured matrix of each spherical particle of the material according to the invention comprises an element X, preferably aluminium, said element X, preferably aluminium, is introduced, when the material is prepared according to the first preparation method of the invention, either during said stage a) of the first preparation method of the invention for preparing said clear solution, or during said stage b) according to said first preferred embodiment of the first preparation method of the invention, or during said stage d) and/or said stage f) and/or said stage g) in accordance with said second preferred embodiment of the first preparation method of the invention. When the material is prepared according to said second preparation method of the invention, said element X, preferably aluminium, is introduced either during said stage a') or during said stage b') in accordance with said first preferred embodiment of the second preparation method of the invention, or during said stage d') and/or said stage f') and/or said stage g') in accordance with said second preferred embodiment. When the material is prepared according to said second variant of said second preparation method of the invention, said element X, preferably aluminium, is introduced either during said stage a') or during said stage b') for preparing said clear solution, or during said stage b') in accordance with said first preferred embodiment, or during said stage d') and/or stage f') and/or stage g') in accordance with said second preferred embodiment. When the material is prepared according to said third preparation method of the invention, element X, preferably aluminium, is introduced either during said stage b") for preparing said clear solution, or during said stage b") in accordance with said first preferred embodiment or during said stage d") and/or stage f") and/or stage g") in accordance with said second preferred embodiment Element X, preferably aluminium, can also be advantageously introduced, several times, while carrying out several stages according to all the possible combinations of the embodiments described above. In particular, it is advantageous to introduce the aluminium during said stage a) and said stage b) or during said stage a) and said stage d) and/or said stage e) when the material of the invention is prepared according to said first preferred embodiment of the invention.

In the particular case where element X is aluminium, the crystallized aluminosilicate obtained according to one of the three preparation methods of the invention then has a Si/Al molar ratio defined from the amount of element silicon introduced during stages a), a') and a") respectively of the first, second and third preparation methods of the invention and the total amount of element aluminium introduced in the stage(s) of one of the three preparation methods according to the various preferred embodiments described above. Under such conditions, the Si/Al molar ratio of the crystallized material according to the invention preferably ranges between 1 and 1000.

When said first preferred embodiment of each one of the three preparation methods of the invention is applied, the amounts of organic and inorganic matter to be introduced for carrying out stage b), stage b') or stage b") have to be adjusted depending on the amount of additional matter of element X, preferably aluminium, introduced in said stage b), b') or b") according to said first embodiment so that the total amount of organic and inorganic matter introduced for preparing the material according to the invention allows the occurrence of a micellization phenomenon leading to the mesostructuration of the matrix of each particle of said material. Element X, preferably aluminium, introduced for carrying out said second preferred embodiment of each one of the three preparation methods of the invention is not involved in the calculation of ratio $V_{inorganic}/V_{organic}$ as defined above in the present description from the moment that it is introduced after the stage allowing a micellization phenomenon leading to the mesostructuration of the matrix of each particle of said material.

Throughout the description of the present invention, the expressions "second method of the invention", "second preparation method according to the invention" and "second material preparation method according to the invention" apply to the case where the material according to the invention is prepared in accordance with the second method of the invention (without applying any one of the two variants), to the case where the material according to the invention is prepared in accordance with the first variant of said second preparation method of the invention and to the case where the material according to the invention is prepared in accordance with the second variant of said second preparation method of the invention.

The crystallized material with hierarchical and organized porosity in the microporosity and mesoporosity domains according to the present invention can be obtained in form of powder, balls, pellets, granules or extrudates, the shaping operations being performed using conventional techniques known to the person skilled in the art. Preferably, the material with hierarchical and organized porosity in the microporosity and mesoporosity domains according to the invention is obtained in form of a powder consisting of elementary spherical particles having a maximum diameter of 200 μm, which facilitates a possible reactant diffusion if the material according to the invention is used in a potential industrial application.

The material according to the invention with hierarchical and organized porosity in the microporosity and mesoporosity domains is characterized by means of several analysis techniques, notably low-angle X-ray diffraction (LAXD), wide-angle X-ray diffraction (WAXD), nitrogen volumetric analysis (BET), transmission electron microscopy (TEM), scanning electron microscopy (SEM) and X-ray fluorescence (XRF).

The low-angle X-ray diffraction technique (values of angle 2θ ranging between 0.5° and 3°) allows to characterize the periodicity on the nanometric scale generated by the organized mesoporosity of the mesostructured matrix of the material according to the invention. In the description hereafter, analysis of the X rays is carried out on powder with a reflection diffractometer equipped with a rear monochromator, using copper radiation (wavelength 1.5406 Å). The peaks usually observed in diffractograms corresponding to a given value of angle 2θ are associated with the inter-reticular distances $d_{(hkl)}$ characteristic of the structural symmetry of the material, ((hkl) being the Miller indices of the reciprocal network) by the Bragg relation: $2\ d_{(hkl)}*\sin(\theta)=n*\lambda$. This indexing then allows to determine the cell parameters (abc) of the direct network, the value of these parameters depending on the hexagonal, cubic or vermicular structure obtained. For example, the low-angle X-ray diffractogram of a mesostructured material, whose microporous and crystallized matrix walls of each spherical particle consist of ZSM-5 type aluminosilicate zeolite entities, obtained according to the first material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$ poly(propylene oxide)$_{70}$-poly(ethylene oxide)$_{106}$ ($PEO_{106}$-$PPO_{70}$-$PEO_{106}$ or F127) as the surfactant, shows a correlation peak exhibiting perfect resolution, corresponding to the correlation distance between pores d characteristic of a vermicular type structure and defined by the Bragg law: $2\ d*\sin(\theta)=n*\lambda$.

The wide-angle X-ray diffraction technique (values of angle 2θ ranging between 5° and 70°) allows to characterize a crystallized solid defined by the repetition of a unit pattern or elementary cell on the molecular scale. As for low-angle X-ray diffraction, the peaks observed in diffractograms corresponding to a given value of angle 2θ are associated with the inter-reticular distances $d_{(hkl)}$ characteristic of the structural symmetry (symmetries) of the material, ((hkl) being the Miller indices of the reciprocal network) by the Bragg relation: $2\ d(hkl)*\sin(\theta)=n*\lambda$. This indexing then allows to determine the cell parameters (abc) of the direct network. Wide-angle X-ray diffraction analysis is thus well suited for structural characterization of the zeolitic entities that make up the crystallized wall of the matrix of each elementary spherical particle that the material according to the invention consists of. In particular, it allows to know the diameter of the micropores of the zeolitic entities. For example, the wide-angle X-ray diffractogram of a mesostructured material, whose microporous and crystallized matrix walls of each spherical particle consist of ZSM-5 type aluminosilicate zeolite entities, obtained according to the first material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ ($PEO_{106}$-$PPO_{70}$-$PEO_{106}$ or F127) as the surfactant, exhibits the wide-angle diffractogram associated with the Pnma symmetry group (No. 62) of the ZSM-5 zeolite. The value of the angle obtained in the X-ray diffractogram allows to go back to the correlation distance d according to the Bragg law: $2\ d*\sin(\theta)=n*\lambda$. The values of the cell parameters a, b, c (a=20,1 Å, b=19,7 Å and c=13,1 Å) obtained for the zeolitic entity characterization are coherent with the values obtained for a ZSM-5 (MFI structural type) zeolite known to the person skilled in the art ("*Collection of simulated XRD powder patterns for zeolites*", 4$^{th}$ revised Edition, 2001, M. M. J. Treacy, J. B. Higgins).

Nitrogen volumetric analysis, which corresponds to the physical adsorption of nitrogen molecules in the porosity of the material via a progressive pressure increase at constant temperature, provides information on the particular textural characteristics (pore diameter, porosity type, specific surface area) of the material according to the invention. In particular, it allows to know the total value of the micropore and mesopore volume of the material. The shape of the nitrogen adsorption isotherm and of the hysteresis loop can give information about the presence of the microporosity linked with the zeolitic entities making up the crystallized walls of the matrix of each spherical particle of the material according to the invention and about the nature of the mesoporosity. Quantitative analysis of the microporosity of the material according to the invention is carried out from the "t" (Lippens-De Boer method, 1965) or the "$\alpha_s$" (method provided by Sing) methods that correspond to transforms of the initial adsorption isotherm as described in "*Adsorption by powders and porous solids. Principles, methodology and applications*" written by F. Rouquerol, J. Rouquerol and K. Sing, Academic Press, 1999. These methods allow in particular to obtain the value of the micropore volume characteristic of the microporosity of the material according to the invention, as well as the specific surface area of the sample. The reference solid used is a LiChrospher Si-1000 silica (M. Jaroniec, M. Kruck, J. P. Olivier, *Langmuir,* 1999, 15, 5410). By way of example, the nitrogen adsorption isotherm of a mesostructured material whose microporous and crystallized matrix walls of each spherical particle consist of ZSM-5 type aluminosilicate zeolite entities, obtained according to the first material preparation method of the invention using TEOS as the silicic precursor, $Al(O^sC_4H_9)_3$ as the aluminic precursor, TPAOH as the structuring agent and the particular block copolymer known as poly(ethylene oxide)$_{106}$-polypropylene oxide)$_{70}$-poly(ethylene oxide) ($PEO_{106}$-$PPO_{70}$-$PEO_{106}$ or F127) as the surfactant, exhibits a great adsorption jump in the P/P0 low values range (where P0 is the saturated vapour pressure at temperature T), followed by a plateau with a very slight slope over a wide pressure range, characteristic of a microporous material and, for the higher P/P0 values, a type IV isotherm and a type H1 hysteresis loop, the associated pore distribution curve being representative of a mesopore population of uniform size centered in the 1.5-30 nm range. As regards the mesostructured matrix, the difference between the value of the mesopore diameter φ and the correlation distance between mesopores d defined by low-angle X-ray diffraction as described above allows to obtain quantity e where e=d−φ and is characteristic of the thickness of the crystallized walls of the mesostructured matrix of the material according to the invention. Similarly, curve $V_{ads}$(ml/g)=f($\alpha_s$) obtained via the aforementioned $\alpha_s$ method is characteristic of the presence of microporosity within the material and it leads to a micropore volume value ranging between 0.01 and 0.4 ml/g. Determination of the total micropore and mesopore volume and of the micropore volume as described above leads to a mesopore volume value for the material according to the invention ranging between 0.01 and 1 ml/g.

Transmission electron microscopy (TEM) analysis is also a commonly used technique for characterizing the organized mesoporosity of the material according to the invention. It allows formation of an image of the solid studied, the contrasts observed being characteristic of the structural organization, the texture, the morphology or the chemical composition of the particles observed, and the resolution of the technique reaches 0.2 nm maximum. In the description hereafter, the TEM photos are obtained from michrotome sections of the sample in order to visualize a section of an elementary spherical particle of the material according to the invention. For example, the TEM images obtained for a mesostructured material the microporous matrix walls of each spherical particle of which consist of ZSM-5 type aluminosilicate zeolite entities obtained according to the first material preparation method of the invention using TEOS as the silicic precursor, Al(O$_s$C$_4$H$_9$)$_3$ as the aluminic precursor, TPAOH as the structuring agent and the particular block copolymer known as poly(ethylene oxide)$_{106}$-poly(propylene oxide)$_{70}$-poly(ethylene oxide)$_{106}$ (PEO$_{106}$-PPO$_{70}$-PEO$_{106}$ or F127) as the surfactant, exhibit spherical elementary particles having a vermicular mesostructure, the matter being defined by the dark zones. Analysis of the image also allows to obtain parameters d, φ and e characteristic of the mesostructured matrix defined above. Analysis of the image also allows to visualize the presence of zeolitic entities that make up the walls of the material according to the invention.

The morphology and the size distribution of the elementary particles were established by analysis of photos obtained by scanning electron microscopy (SEM).

The invention is illustrated by the following examples.

EXAMPLES

In the examples hereafter, the aerosol technique used is the technique described above in the description of the invention.

For each one of the examples below, the $V_{inorganic}/V_{organic}$ ratio of the mixture from stage b), stage b') or stage b") is calculated. This ratio is defined as follows: $V_{inorganic}/V_{organic}=(m_{inorg}*\rho_{org})/(m_{org}*\rho_{inorg})$ with $m_{inorg}$ the final mass of the inorganic fraction in form of condensed oxide(s), i.e. SiO$_2$ and AlO$_2$, in the solid elementary particle obtained by atomization, $m_{org}$ the total mass of the non-volatile organic fraction found in the solid elementary particle obtained by atomization, i.e. the surfactant and the structuring agent, $\rho_{org}$ and $\rho_{inorg}$ the densities respectively associated with the non-volatile organic and inorganic fractions. In the following examples, we consider that $\rho_{org}$=1 and $\rho_{inorg}$=2. Thus, the $V_{inorganic}/V_{organic}$ ratio is calculated as equal to $V_{inorganic}/V_{organic}=(m_{SiO2}+m_{AlO2})/[2*(m_{structuring\ agent}+m_{surfactant})]$. Ethanol, soda and water are not taken into account in the calculation of said $V_{inorganic}/V_{organic}$ ratio.

Example 1 (Invention)

Preparation according to the first method of the invention of a material with hierarchical and organized porosity in the microporosity and mesoporosity domains, whose microporous and crystallized walls consist of ZSM-5 type aluminosilicate zeolite entities such that molar ratio Si/Al=59

6.86 g of a tetrapropylammonium hydroxide solution (TPAOH 40% by mass in an aqueous solution) are added to 0.37 g of aluminium sec-butoxide (Al(O$^s$C$_4$H$_9$)$_3$). After 30-min strong stirring at ambient temperature, 27 g of demineralized water and 18.75 g of tetraethylorthosilicate (TEOS) are added. The mixture is left under strong stirring at ambient temperature for 18 hours so as to obtain a clear solution. A solution containing 66.61 g ethanol, 61.24 g water and 5.73 g surfactant F127 (pH value of the mixture=13.5) is then added to this solution. The $V_{inorganic}/V_{organic}$ ratio of the mixture is 0.32. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an O$_2$/N$_2$ mixture in PVC tubes. They are then fed into an oven set at a temperature of 350° C. The powder collected is then dried for 18 hours in a stove at 95° C. 100 mg of this powder are placed in a 1-l autoclave in the presence of 0.6 ml distilled water. The autoclave is brought to 95° C. for 48 hours. The powder is dried in the stove at 100° C., then calcined in air for 5 hours at 550° C. The solid is characterized by low-angle and wide-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.19 ml/g (N$_2$), a value of the mesopore volume $V_{meso}$ of 0.48 ml/g (N$_2$) and a specific surface area of the final material S=760 m$^2$/g. The mesopore diameter φ characteristic of the mesostructured matrix is 6.5 nm. The low-angle X-ray diffraction analysis leads to the visualization of a correlation peak at angle 2θ=0.79°. The Bragg relation 2 d *sin (θ)=1.5406 allows to calculate correlation distance d between the organized mesopores of the material, i.e. d=11 nm. The thickness of the walls of the mesostructured material defined by e=d–φ thus is e=4.5 nm. The wide-angle X-ray diffraction analysis leads to the visualization of diffraction peaks at angles 2θ=7.9° and 8.9° compatible with the MFI crystalline structure of the ZSM-5 zeolite. The Si/Al molar ratio obtained by XF is 59. A SEM image of the spherical elementary particles thus obtained shows that these particles have a size characterized by a diameter ranging between 50 and 3000 nm, the size distribution of these particles being around 300 nm.

Example 2 (Invention)

Preparation according to the second method of the invention of a material with hierarchical and organized porosity in the microporosity and mesoporosity domains, whose microporous and crystallized walls consist of ZSM-5 type aluminosilicate zeolite entities such that molar ratio Si/Al=59

6.86 g of a tetrapropylammonium hydroxide solution (TPAOH 40% by mass in an aqueous solution) are added to 0.37 g of aluminium sec-butoxide (Al(O$^s$C$_4$H$_9$)$_3$). After 30-min strong stirring at ambient temperature, 27 g of demineralized water and 18.75 g of tetraethylorthosilicate (TEOS) are added. The mixture is left under strong stirring at ambient temperature for 18 hours. This solution is placed in a stove at 80° C. for 25 h so as to obtain a colloidal solution containing ZSM-5 type zeolite nanocrystals whose size is close to 50 nm (analysis by light scattering and TEM). A solution containing 66.61 g ethanol, 61.24 g water and 0.17 g surfactant F127 (pH value of the mixture=13.5) is then added to this suspension cooled to ambient temperature. The $V_{inorganic}/V_{organic}$ ratio of the mixture is 0.92. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a temperature of 350° C. The powder collected is then dried for 18 hours in a stove at 95° C. 100 mg of this powder are placed in a 1-l autoclave in the presence of 0.6 ml distilled water. The autoclave is brought to 95° C. for 48 hours. The powder is dried in the stove at 100° C., then calcined in air for 5 hours at 550° C. The solid is characterized by wide-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.15 ml/g ($N_2$), a value of the mesopore volume $V_{meso}$ of 0.55 ml/g ($N_2$) and a specific surface area of the final material S=310 m²/g. The mesopore diameter φ characteristic of the mesostructured matrix is 19 nm. The TEM analysis combined with the nitrogen adsorption volumetric analysis leads to a value for the thickness of the walls of the order of 50 nm. The wide-angle X-ray diffraction analysis leads to the visualization of diffraction peaks at angles 2θ=7.9° and 8.9° compatible with the MFI crystalline structure of the ZSM-5 zeolite. The Si/Al molar ratio obtained by XF is 59. A SEM image of the spherical elementary particles thus obtained shows that these particles have a size characterized by a diameter ranging between 50 and 3000 nm, the size distribution of these particles being around 300 nm.

Example 3 (Invention)

Preparation according to the third method of the invention of a material with hierarchical and organized porosity in the microporosity and mesoporosity domains, whose microporous and crystallized walls consist of ZSM-5 type aluminosilicate zeolite entities such that molar ratio Si/Al=29

3.27 g of a tetrapropylammonium hydroxide solution (TPAOH 40% by mass in an aqueous solution) are added to 0.48 g of aluminium sec-butoxide (Al(O$^s$C$_4$H$_9$)$_3$). After 30-min strong stirring at ambient temperature, 8.40 g of demineralized water and 5.97 g of tetraethylorthosilicate (TEOS) are added. The mixture is left under strong stirring at ambient temperature for 5 days so as to obtain a clear solution. 3.6 g ZSM-5 (MFI) zeolite nanocrystals in raw synthesis form (Si/Al=60) of size equal to 40 nm are added to this solution and dispersed by sonication for 1 hour. A solution containing 66.61 g ethanol, 61.24 g water and 0.23 g surfactant F127 (pH value of the mixture=13.5) is then added. The $V_{inorganic}/V_{organic}$ ratio of the mixture is 1.82. The mixture is left under stirring for 10 minutes and dispersion of the crystals is completed by sonication for 30 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a temperature of 350° C. The powder collected is then dried for 18 hours in a stove at 95° C. 100 mg of this powder are placed in a 1-l autoclave in the presence of 0.6 ml distilled water. The autoclave is brought to 95° C. for 48 hours. The powder is then dried at 100° C., then calcined in air for 5 hours at 550° C. The solid is characterized by wide-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.17 ml/g ($N_2$), a value of the mesopore volume $V_{meso}$ of 0.43 ml/g ($N_2$) and a specific surface area of the final material S=340 m²/g. The mesopore diameter φ characteristic of the mesostructured matrix is 20 nm. The TEM analysis combined with the nitrogen adsorption volumetric analysis leads to a value for the thickness of the walls of the order of 50 nm. The wide-angle X-ray diffraction analysis leads to the visualization of diffraction peaks at angles 2θ=7.9° and 8.9° compatible with the MFI crystalline structure of the ZSM-5 zeolite. The Si/Al molar ratio obtained by XF is 29. A SEM image of the spherical elementary particles thus obtained shows that these particles have a size characterized by a diameter ranging between 50 and 3000 nm, the size distribution of these particles being around 300 nm.

Example 4 (Invention)

Preparation according to the third method of the invention of a material with hierarchical and organized porosity in the microporosity and mesoporosity domains, whose microporous and crystallized walls consist of zeolitic entities of Beta (BEA) zeolite such that the molar ratio Si/Al=29

2.37 g of a tetrapropylammonium hydroxide solution (TPAOH 40% by mass in an aqueous solution) are added to 0.48 g of aluminium sec-butoxide (Al(O$^s$C$_4$H$_9$)$_3$). After 30-min strong stirring at ambient temperature, 8.94 g of demineralized water and 5.97 g of tetraethylorthosilicate (TEOS) are added. The mixture is left under strong stirring at ambient temperature for 5 days so as to obtain a clear solution. 3.6 g Beta (BEA) zeolite nanocrystals in raw synthesis form (Si/Al=60), of size equal to 40 nm, are added to this solution and dispersed by sonication for 1 hour. A solution containing 66.61 g ethanol, 61.24 g water and 0.23 g surfactant F127 (pH value of the mixture=11.5) is then added. The $V_{inorganic}/V_{organic}$ ratio of the mixture is 2.38. The mixture is left under stirring for 10 minutes and dispersion of the crystals is completed by sonication for 30 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a temperature of 350° C. The powder collected is then dried for 18 hours in a stove at 95° C. 100 mg of this powder are placed in a 1-l autoclave in the presence of 0.6 ml distilled water. The autoclave is brought to 95° C. for 48 hours. The powder is dried at 100° C., then calcined in air for 5 hours at 550° C. The solid is characterized by wide-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.21 ml/g ($N_2$), a value of the mesopore volume $V_{meso}$ of 0.41 ml/g ($N_2$) and a specific surface area of the final material S=410 m²/g. The diameter φ characteristic of the mesostructured matrix is 18 nm. The TEM analysis combined with the nitrogen adsorption volumetric analysis leads to a value for the thickness of the walls of the order of 50 nm. The wide-angle X-ray diffraction analysis leads to the visualization of diffraction peaks at angles 2θ=7.7° compatible with the BEA crystalline structure of the Beta zeolite. The Si/Al molar ratio obtained by XF is 29. A SEM image of the spherical elementary particles thus obtained shows that these particles have a size characterized by a diameter ranging between 50 and 3000 nm, the size distribution of these particles being around 300 nm.

Example 5 (Invention)

Preparation according to the second method of the invention of a material with hierarchical and organized porosity in the microporosity and mesoporosity domains, whose microporous and crystallized walls consist of aluminosilicate zeolite entities such that the molar ratio Si/Al=13

6.86 g of a tetrapropylammonium hydroxide solution (TPAOH 40% by mass in an aqueous solution) are added to 0.37 g of aluminium sec-butoxide ($Al(O^sC_4H_9)_3$). After 30-min strong stirring at ambient temperature, 27 g of demineralized water and 18.75 g of tetraethylorthosilicate (TEOS) are added. The mixture is left under strong stirring at ambient temperature for 18 hours. This solution is placed in a stove at 80° C. for 25 h. A solution containing 66.61 g ethanol, 61.24 g water and 0.17 g surfactant F127 (pH value of the mixture=13.5) is added to this suspension cooled to ambient temperature. The $V_{inorganic}/V_{organic}$ ratio of the mixture is 0.92. The mixture is left under stirring for 10 minutes. It is then sent to the atomization chamber of the aerosol generator as described in the description above and the solution is sprayed in form of fine droplets under the action of the carrier gas (dry air) introduced under pressure (P=1.5 bar). The droplets are dried according to the protocol mentioned in the description above: they are conveyed via an $O_2/N_2$ mixture in PVC tubes. They are then fed into an oven set at a drying temperature of 350° C. The powder collected is then dried for 18 hours in a stove at 95° C. 250 mg of this powder are placed in a 2.5-l autoclave in the presence of 1.5 ml distilled water. The autoclave is brought to 95° C. for 48 hours. The powder is then calcined in air for 5 hours at 550° C. 100 mg of this powder are placed under primary vacuum at 110° C. for 4 hours, then inerted with argon. 0.255 g of ($Al(O^sC_4H_9)_3$) is dissolved in 10 ml pentane in an inert atmosphere, then added to the powder. The mixture is thereafter brought to reflux under stirring for 12 h. The solid obtained is washed three times with 10 ml pentane, then dried in an argon stream for 2 hours, drawn under vacuum, dried in ambient air, then in the stove at 100° C. for 1 night. The powder is calcined for 5 h at 550° C. The solid is characterized by wide-angle XRD, nitrogen volumetric analysis, TEM, SEM, XF. The TEM analysis shows that the final material has an organized mesoporosity characterized by a vermicular structure. Nitrogen volumetric analysis combined with the $\alpha_s$ method analysis leads to a value of the micropore volume $V_{micro}$ of 0.09 ml/g ($N_2$), a value of the mesopore volume $V_{meso}$ of 0.45 ml/g ($N_2$) and a specific surface area of the final material S=280 m$^2$/g. The mesopore diameter φ characteristic of the mesostructured matrix is 17 nm. The TEM analysis combined with the nitrogen adsorption volumetric analysis leads to a value for the thickness of the walls of the order of 50 nm. The wide-angle X-ray diffraction analysis leads to the visualization of diffraction peaks at angles 2θ=7.9° and 8.9° compatible with the MFI crystalline structure of the ZSM-5 zeolite. The Si/Al molar ratio obtained by XF is 13. A SEM image of the spherical elementary particles thus obtained shows that these particles have a size characterized by a diameter ranging between 50 nm and 3 μm, the size distribution of these particles being around 300 nm.

The invention claimed is:

1. A material with hierarchical and organized porosity in the microporosity and mesoporosity domains said material comprising at least two elementary spherical particles, each one of said particles comprising a matrix based on silicon oxide, mesostructured, having a mesopore diameter ranging between 1.5 and 30 nm and exhibiting microporous and crystallized walls consisting of zeolitie entities of a thickness ranging between 1 and 60 nm, said elementary spherical particles having a maximum diameter of 200 microns.

2. A material as claimed in claim 1, such that the mesopore diameter ranges between 2 and 20 nm.

3. A material as claimed in claim 1, such that said zeolitic entities comprise at least one zeolite selected from a group consisting of MFI, BEA, FAU and LTA.

4. A material as claimed in claim 1, such that said matrix based on silicon oxide is entirely silicic.

5. A material as claimed in claim 1, such that said matrix based on silicon oxide comprises at least one element X that is aluminum, iron, boron, indium or gallium.

6. A material as claimed in claim 5, such that element X is aluminium.

7. A material as claimed in claim 1, such that said mesostructured matrix has a hexagonal, cubic or vermicular structure.

8. A material as claimed in claim 1, such that said elementary spherical particles have a diameter ranging between 50 nm and 3 microns.

9. A material according to claim 8, having a mesoporous volume between 0.01 and 1 ml/g and a microporous volume ranging between 0.01 and 0.4 ml/g, both volumes being measured by nitrogen volumetric analysis and wherein the specific surface of the elementary spherical particles being between 250 and 1000 m$^2$/g.

10. A material as claimed in claim 1, such that the material has a specific surface area ranging between 100 and 1100 m$^2$/g.

11. A method of preparing a material as claimed in claim 1, comprising the following stages: a) preparing a clear solution containing the zeolitic entity precursor elements, i.e. at least one structuring agent, at least one silicic precursor and optionally at least one precursor of at least one element X selected from among aluminium, iron, boron, indium and gallium ; b) mixing into a solution at least one surfactant and at least said clear solution obtained in stage a) such that the ratio of the volumes of inorganic and organic matter $V_{inorganic}/V_{organic}$ ranges between 0.26 and 4; c) aerosol atomizing said solution obtained in stage b) so as to lead to the formation of spherical droplets; d) drying said droplets; e) autoclaving the particles obtained in stage d); f) drying said particles obtained in stage e); and g) eliminating said structuring agent and said surfactant so as to obtain a crystallized material with hierarchical and organized porosity in the microporosity and mesoporosity domains.

12. A preparation method as claimed in claim 11, such that the ratio of the inorganic and organic matter volumes ranges between 0.3 and 2.

13. A preparation method as claimed in claim 11, such that element X is aluminium.

14. A preparation method as claimed in claim 11, such that said surfactant is a three-block copolymer, each block consisting of a poly(alkylene oxide) chain.

15. A preparation method as claimed in claim 14, such that said three-block copolymer consists of two poly(ethylene oxide) chains and of one poly(propylene oxide)chain.

16. A method of preparing a material as claimed in claim 1, comprising the following stages: a') preparing, from at least one structuring agent, at least one silicic precursor and optionally at least one precursor of at least one element X selected from among aluminium, iron, boron, indium and gallium, a solution containing zeolite nanocrystals of maximum nanometric size equal to 60 nm in order to obtain a colloidal solution wherein said nanocrystals are dispersed; b') mixing into a solution at least one surfactant and at least said solution obtained in stage a') such that the ratio of the volumes of inorganic and organic matter $V_{inorganic}/V_{organic}$ ranges between 0.26 and 4; c') aerosol atomizing said solution obtained in stage b') so as to lead to the formation of spherical droplets; d') drying said droplets; and g') eliminating said structuring agent and said surfactant so as to obtain a crystallized material with hierarchical and organized porosity in the microporosity and mesoporosity domains.

17. A method as claimed in claim 16, such that said stage d') is followed by a stage e') comprising autoclaving the particles obtained in stage d'), then by a stage f') comprising drying said particles obtained in stage e'), said stage f') being then followed by said stage g').

18. A method as claimed in claim 16, such that stage b') is carried out by mixing into a solution at least one surfactant, at least said colloidal solution obtained in stage a') and at least one clear solution containing the zeolitic entity precursor elements, i.e. at least one structuring agent, at least one silicic precursor and possibly at least one precursor of at least one element X selected from among aluminium, iron, boron, indium and gallium.

19. A method of preparing a material as claimed in claim 1, comprising the following stages: a") redispersing into a solution zeolite crystals so as to obtain a colloidal solution of zeolite nanocrystals of maximum nanometric size equal to 60 nm, b") mixing into a solution at least one surfactant, at least said colloidal solution obtained in a") and at least one clear solution containing the zeolitic entity precursor elements, i.e. at least one structuring agent, at least one silicic precursor and optionally at least one precursor of at least one element X selected from among aluminium, iron, boron, indium and gallium, said mixture being such that the ratio of the volumes of inorganic and organic matter $V_{inorganic}/V_{organic}$ ranges between 0.26 and 4; c") aerosol atomizing said solution obtained in stage b") so as to lead to the formation of spherical droplets; d") drying said droplets; e") autoclaving the particles obtained in d"); f") drying said particles obtained in e"), and g") eliminating said structuring agent and said surfactant so as to obtain a crystallized material with hierarchical and organized porosity in the microporosity and mesoporosity domains.

* * * * *

UNITED STATES PATENT AND TRADEMARK OFFICE
CERTIFICATE OF CORRECTION

PATENT NO. : 8,623,508 B2  Page 1 of 1
APPLICATION NO. : 12/676750
DATED : January 7, 2014
INVENTOR(S) : Chaumonnot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 753 days.

Signed and Sealed this
Twenty-second Day of September, 2015

Michelle K. Lee
*Director of the United States Patent and Trademark Office*